United States Patent [19]

Boutsicaris

[11] 3,773,709

[45] Nov. 20, 1973

[54] REINFORCED BUTADIENE-STYRENE CO-POLYMERS

[75] Inventor: Stephen P. Boutsicaris, Akron, Ohio

[73] Assignee: The Firestone Tire & Rubber Company, Akron, Ohio

[22] Filed: May 17, 1972

[21] Appl. No.: 254,297

Related U.S. Application Data

[63] Continuation-in-part of Ser. No. 854,280, Aug. 29, 1969, abandoned.

[52] U.S. Cl. ...... 260/41.5 A, 260/41.5 R, 260/83.7, 260/94.2 M, 260/94.7 A, 264/DIG. 53
[51] Int. Cl. .......................... C08c 11/16, C08d 3/08
[58] Field of Search ............... 260/41.5 A, 94.2 M, 260/94.7 A; 264/DIG. 53

[56] References Cited
UNITED STATES PATENTS

| 3,083,175 | 3/1963 | Safford et al. | 260/845 |
| 3,105,828 | 10/1963 | Porter | 260/83.7 |
| 3,264,156 | 8/1966 | Vanderbilt et al. | 158/169 |

OTHER PUBLICATIONS

Whitby–Synthetic Rubber (Wiley) (N.Y.) (1954), pages 18–20, TS 1925 W 45

*Primary Examiner*—Allan Lieberman
*Assistant Examiner*—H. H. Fletcher
*Attorney*—S. M. Clark

[57] ABSTRACT

A new sheet molding compound (SMC) comprises a calendered sheet of a high-viscosity, high-vinyl butadiene-styrene copolymer containing a peroxide compound equivalent in amount to 0.5–8 percent by weight of dicumyl peroxide. This sheet molding compound can comprise one calendered sheet containing fiberglass or other fibrous reinforcement, or if desired, may comprise two or more such sheets with or without a layer of fiberglass or other fibrous reinforcement between adjacent sheets. Such calendered sheets or composites are used in a one-step single-component system for compression molding with improved results in handling and in ultimate properties as compared to present sheet molding compounds.

13 Claims, No Drawings

REINFORCED BUTADIENE-STYRENE CO-POLYMERS

This application is a continuation-in-part of application Ser. No. 854,280 filed Aug. 29, 1969, now abandoned.

BACKGROUND OF THE INVENTION

1. Field of the Invention

This invention relates to a sheet molding composition for compensation molding comprising a calendered sheet of high-viscosity, high-vinyl butadiene-styrene copolymer containing a peroxide curing agent. It also relates to a calendered sheet per se of a thermoset resin. Further, it relates to a composite of two or more such sheets with or without a layer of fiberglass interposed between each pair of sheets.

2. Related Prior Art

Various sheet molding compounds are known in the industry which generally comprise glass-reinforced polyester resins. The polyester resin is chemically thickened with MgO to form a rather flexible thermoplastic sheet. Such are referred to in Modern Plastics, Page 36, February, 1969. The polyester resin generally has a monomer such as styrene incorporated therein in order to copolymerize during the molding operation so as to produce a thermosetting resin. Consequently, the sheet must be protected against vaporization and loss of the styrene and the sheet is generally protected by a layer of polyethylene on each side of the sheet. The polyethylene sheets must be removed before the SMC is used in compression molding. Moreover, even with the polyethylene sheets in place, the shelf life of the composition is in the range of 3 weeks to 3 months.

U.S. Pat. No. 3,083,175 describes the peroxide curing of polybutadiene high in 1,2-microstructure prepared by alkali metal polymerization to give hard cured products having "the characteristics of hard rubber." Percent elongations are reported of 100 percent and more. Polybutadienes having intrinsic viscosities of 1.0–8.0, preferably 3.0–6.0, are used and no indication is given that anything is used other than the broad molecular weight distribution normally obtained with alkali metal catalyzed polymerization. Because of the elasticity reported for the "hard rubber" produced, the product of this patent is not a thermosetting material that would be considered suitable for a sheet molding compound which within the industry is regarded as a suitable matrix for a glass fiber reinforced thermoset composite.

The patentee discloses only butadiene homopolymers for his purpose. Whether it is in the inherent nature of the homopolymer or in the high molecular weights used there is apparently not sufficient crosslinking in the curing of patentee's materials to give the rigid characteristics necessary for use in thermosetting glass reinforced sheet molding compound as understood in the industry to be a more rigid non-elongatable material than the hard rubber produced by patentee.

STATEMENT OF THE INVENTION

It has now been found that a high-viscosity, high-vinyl butadiene-styrene copolymer composition having 50–75 percent by weight of butadiene and 25–50 O—by weight of a vinyl aryl comonomer in the copolymer, and containing a peroxide curing agent and fibrous reinforcement, can be calendered to form a sheet suitable for sheet molding compound. The sheet molding compound can comprise one or more such sheets, with or without a layer of fiber glass interposed between adjacent sheets and with or without the fiber glass impregnated with a resin binder of the type presently used for similar purposes, or, preferably, of the type used in the calendered sheet. The peroxide curing agent is one having the formula

$$R_2(CH_3)C(-)-O-C(CH_3)R_2$$

wherein R is an alkyl or aryl group of 1–10 carbon atoms. The amount of peroxide is equivalent to 0.5–8 percent by weight of dicumyl peroxide.

The calendered sheet of this invention has the advantage that it can be free of monomeric compound which may be lost by vaporization, since the crosslinking for thermosetting of the polymer used in this invention can be effected through the vinyl groups in the polymer itself. Consequently, there is no need to have the protective films or sheets used in the prior art sheet molding compounds. Moreover, the calendered sheet of this invention is relatively non-sticky and has sufficient green strength so as not to require a protective exterior layer.

The type of high-viscosity, high-vinyl butadiene-styrene copolymer and compositions containing the type of peroxide herein are disclosed and claimed in the co-pending application of S. B. Boutsicaris and R. A. Hayes, Ser. No. 818,971, filed Apr. 24, 1969.

The butadiene-styrene copolymer has 50–75 percent, preferably 55–65 percent by weight of butadiene in the polymer, with the balance being a vinyl aryl or isopropenyl aryl compound, preferably, styrene, and has at least 60 percent, preferably at least 80 percent by weight of the butadiene therein in the vinyl type of butadiene repeating unit structure. The number average molecular weight (determined by gel permeation chromatography) is in the range of 10,000–50,000, and the molecular weight distribution is such that at least 50 percent and preferably 90 percent of the polymer has a molecular weight above 10,000 and at least 95 percent has a molecular weight above 2,000. It has been found that the presence of higher proportions of lower molecular weight polymers than allowed by these limitations causes slow curing rates and poor physical properties in the cured product.

The particular molecular weight range and molecular weight distribution has been found to be particularly suited for the purpose of this invention. Molecular weights above this range are difficult to process and give unsatisfactory results, while low molecular weight copolymers give insufficient curing.

Homopolymers of butadiene have been found to be inferior to the copolymers for this purpose. The homopolymers are not millable in this molecular weight range and when homopolymers are selected in a millable higher molecular weight range the cured products have microcracks and are mechanically inferior to products produced from the copolymers.

The proportion of peroxide used is equivalent to approximately 0.5–8 parts by weight of dicumyl peroxide per 100 parts by weight of polymer, and the peroxide is one which gives radicals having the structure $R_2(CH_3)CO\cdot$, where R is a hydrocarbon radical of 1–20 carbon atoms. The butadiene polymer should have a dilute solution viscosity of 0.19–1.2, preferably 0.6–1.0. The amount of peroxy compound used in the curing process of this invention is considerably higher than is normally used for rubber vulcanization.

The curing temperature is advantageously at least 250° F. (120° C.), preferably about 300°–350° F. (150°–177° C.). Generally no advantage in the process or product is obtained by exceeding a temperature of 420° F. (215° C.). Obviously, the higher the temperature the shorter will be the curing time required. Generally at 350° F. (177° C.) a satisfactory cure is obtained in less than 4 minutes. Cure times of more than 4 minutes usually provide no added advantage. Where fast cures are desired it is desirable to use a filler to avoid crazing or cracking. A filler, including the asbestos fibers, glass fibers or other fibrous reinforcement, is advantageously used in the proportion of 35–70, preferably 40–60 weight percent based on the combined resin-filler composition.

As pointed out above, the butadiene-styrene copolymers defined herein are found to be much more suitable for the practice of this invention than butadiene homopolymers. While styrene is preferred as the comonomer, other vinyl aryl compounds including isopropenyl aryl compounds, may be used. The comonomers are preferably vinyl aryl or isopropenyl aryl compounds or derivatives thereof having alkyl, aralkyl, cycloalkyl or chlorine attached to the aromatic nucleus, and preferably having no more than 20 carbon atoms.

Typical of these aromatic comonomers are styrene, alphamethyl styrene, vinyl toluene, isopropenyl toluene, ethyl styrene, p-cyclohexyl styrene, o-, m- and p-Cl-styrene, vinyl naphthalene, vinyl methyl naphthalene, vinyl butyl naphthalene, vinyl cyclohexyl naphthalene, isopropenyl naphthalene, isopropenyl isopropyl naphthalene, 1-vinyl-4-chloronaphthalene, 1-isopropenyl-5-chloronaphthalene, vinyl diphenyl, vinyl diphenylmethane, isopropenyl diphenyl, isopropenyl diphenylmethane, vinyl diphenylethane, 4-vinyl-4'-methyl diphenyl, 4-vinyl-4'-chlorodiphenyl, and the like.

The viscosity of the copolymer, the molecular weight distribution and the percent of vinyl repeating units in the copolymer are very critical elements in the invention. Properties will vary for a particular average molecular weight depending on the molecular weight distribution. For example, an average molecular weight of 100,000 in one case can comprise a broad molecular weight distribution having molecular weights from 1,000 to 1,000,000 and in another case a narrow molecular weight distribution ranging from 90,000 to 110,000. The properties of the two can vary considerably even though the two may have the same average molecular weight.

High viscosity and high molecular weight polymers have poor flow, and are much more difficult to compound and to use in molding operations. However, polymers of low viscosity and low molecular weight have slow cure rates and fail to develop suitable physical properties. For various molecular weights the viscosity will vary according to the styrene content and the content of 1,2-structure in the butadiene repeating units. For example, for a particular molecular weight of a copolymer a higher styrene content will give a higher viscosity and a higher percent 1,2-microstructure will also give a higher viscosity. Generally, however, copolymers having a dilute solution viscosity (DSV) in the range of 0.08–0.9, preferably 0.3–0.5, are suitable for the practice of this invention.

Dilute solution viscosity is defined as the inherent viscosity determined at 25° C. on a 0.4 percent solution of the polymer in toluene. It is calculated by dividing the natural logarithm of the relative viscosity by the percent concentration of the solution, i.e., it is the inherent viscosity measured at 0.4 percent concentration.

A very important factor in this invention is the fact that the copolymer molecular weight distribution should have at least 50 percent above a molecular weight of 10,000, preferably 90 percent above 10,000, and at least 95 percent above a molecular weight of 2,000. Greater proportions of low molecular weight polymers than specified will result in slow cure rates and desired properties are not attained. With higher molecular weights the copolymers are difficult to process and give cured products with microcracks and other mechanical defects. The number average molecular weight (determined by gel permeation chromatography) should be no lower than 10,000.

It is known in the art that anionic polymerization catalysts which are soluble in the particular polymerization system produce polymers with relatively narrow molecular weight distributions. Examples of these are the alkyl and aryl lithium catalysts, and aryl sodium catalysts in eher solution, and sodium and lithium complexes with naphthalene or biphenyl in ether solution. Metallic lithium and sodium and alkyl sodiums, which are insoluble, give undesirably broad molecular weight distribution polymers.

Butadiene polymers of appropriate molecular weight distribution can be prepared by using soluble lithium catalyst to effect the polymerization, such as butyl lithium. Sodium catalyzed polymerizations can be used when tetrahydrofurane and naphthalene are used as solvents to give very narrow molecular weight distributions, although the vinyl content in such case is generally too low. It is also possible by extraction separation methods to prepare copolymer having appropriate molecular weight distribution for the purpose of this invention. It has been found that polymers producing desirable properties in the cured product will cure in the formulation given below to a Rockwell E hardness of 70 or more within one minute at 175° C.

While the DSV of the butadiene polymer is advantageously at least 0.19, it is generally preferable to work with polymers having a DSV of 0.3 or higher. It is advantageous to work with polymers having viscosities as high as can be tolerated in the various processing steps for mixing the peroxide and thereafter fabricating the product. Obviously, the more viscous polymers present greater difficulty in the uniform distribution of the peroxide in the polymer.

The process of this invention lends itself very easily and conveniently to liquid compounding whereby the butadiene-styrene copolymer can be blended into solvents for compounding, and the solvent removed prior to fabrication and curing the copolymer-peroxide blend. In solution compounding, the copolymer is dissolved or suspended in hexane, heptane, toluene or other solvent such as used in the preparation of the copolymer. The solution is mixed with the perioxide and a filler, as well as any other modifiers; next the solvent is removed, for example by evaporation; and then the copolymer composition is processed according to ordinary techniques. If desired, the components may be mixed by mill blending using double arm mixers or other types of internal mixers, particularly when there are no fibers present that will be broken by the milling.

If desired, a portion or all of the solvent may be replaced by a monomer such as styrene or t-butyl styrene which will be copolymerized on curing and retained in the composition. However high proportions of such comonomers may detract from the ultimate strength and other properties.

However, the copolymers used in the practice of this invention have such good processability that it is possible to use the compositions with little or no solvent to prepare the calendered sheets.

The peroxide-cured products of this invention have relatively good color, are generally opaque and have excellent heat resistance. These products have excellent chemical resistance and are essentially immune to swelling in hydrocarbon solvents including benzene.

Cured products having flexural modulus of 30,000 to 2 million psi can be obtained. Rockwell M hardnesses of 80–120 and Rockwell E hardnesses of 70–110 are easily obtained, with heat distortion temperatures in excess of 400° F. (200° C.) and in many cases about 500° F. (260° C.).

The peroxides used are advantageously those having a reasonably fast rate of decomposition at the temperature being used. In some cases it is desirable to use a mixture of peroxides, one having a faster rate of decomposition as the temperature is raised gradually to the desired temperature range, and the other peroxide being slower to decompose in the lower temperature range, but reaching a high rate of decomposition later in the heating period.

The peroxides suitable for use in the practice of this invention can be represented by the formula $$CH_3C(R)_2O-OC(R)_2CH_3$$

wherein R represents aryl or alkyl, including cycloalkyl, aralkyl, alkaryl, etc., of 1–20 carbon atoms. The respective R groups in the particular compounds can be similar or dissimilar.

Typical R groups include methyl, ethyl, propyl, butyl, hexyl, heptyl, decyl, dodecyl, octadecyl, phenyl, tolyl, xylyl, benzyl, phenethyl, naphthyl, methylnaphthyl, naphthylethyl, diphenyl, benzylphenyl, butylphenyl, cyclohexyl, cycloheptyl, cyclohexylmethyl, cycloheptylethyl, methylcycloheptyl, etc.

Typical peroxy compounds of the above formula which decompose to give the desired free radical, namely $CH_3C(R)_2O\cdot$, include various diperoxides and mixed peroxides. Specific illustrations of these include dicumyl peroxide, ditertiarybutyl peroxide, tertiarybutyl-cumyl peroxide, ditertiaryamyl peroxide, tertiarybutyl-tertiaryamyl peroxide, tetriaryamyl-cumyl peroxide, ditertiaryoctyl peroxide, bis(1,1-diphenylethyl) peroxide, bis(1,1-dicyclohexyl-ethyl) peroxide, bis(1-cyclohexyl-1-methyl-ethyl) peroxide, bis(1-phenyl-1-ethyl-ethyl) peroxide. etc. The symmetrical peroxides which have identical groups on each side of the peroxy oxygen-atoms are more easily available and therefore preferable. However, where mixed peroxides, that is peroxides having two different $CH_3C(R)_2O\cdot$ radicals, are available, these can be used very satisfactorily.

The peroxy catalyst is advantageously used in an amount equivalent to 0.5–8 parts by weight of dicumyl peroxide per 100 parts by weight of polymer. Since the molecular weights of the various peroxy compounds vary, the proportions required to give the same amount of peroxy groups or free radicals is determined by the equivalent weight. Therefore the proportions of peroxy compound required to effect the desired curing or rate of curing is defined as the amount equivalent to 0.5–8 parts by weight of dicumyl peroxide. Sometimes commerical peroxides are sold in diluted form such as "Dicup 40." These can be used, the amount used being calculated according to the actual peroxide content.

The optimum proportion of peroxide depends on the percentage of vinyl repeating units contained in the copolymer, the higher vinyl content polymers requiring less catalyst within the indicated range, and the lower vinyl content copolymers within the cited percentage range requiring more of the epoxy compound. Preferably 0.5–3 parts of dicumyl peroxide or equivalent amount of other peroxide compound is used for copolymers having a vinyl repeating unit content of 80 percent or more of the butadiene repeating unit content and 3–8 parts of dicumyl peroxide or equivalent amount of other peroxy compound is preferred for copolymers having a vinyl content of 60–80 percent. Vinyl contents of less than 60 percent do not produce the desired results of this invention even with larger amounts of peroxide.

For fast cure the copolymers are loaded with a high volume of fillers. Advantageously 25–70 weight percent of filler is used, and perferably 40–60 weight percent. Lower amounts of filler usually result in products having inferior physical properties and a strong tendency to crack during the molding operation. Suitable fillers include glass fibers, asbestos fibers, silica, alumina, mica, feldspar, talc, clay, powdered metal, such as aluminum, iron, brass, zinc and the like, wood flour, cellulosic fibers, carbon black, graphite, etc. Various fibrous materials such as glass fibers, asbestos fibers, cellulosic fibers, and the like are preferred over the mineral powders. The other inorganic fillers listed are next in order of preference. Particle size of filler is limited only by practical considerations of mixing and compounding.

For maximum development of desired properties it is desirable to add an agent to effect coupling between the filler and the polymer. Particularly suitable for this purpose are organosilane compounds, such as:

n-(Trimethoxysilylpropyl) ethylenediamine:

$$(CH_3O)_3Si(CH_2)_3NH(CH_2)_2NH_2$$

n-(Dimethoxymethylsilylisobutyl) ethylenediamine:

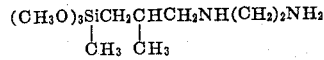

γ-Methacryloxypropyltrimethoxysilane:

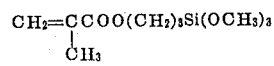

γ-Glycidoxypropyltrimethoxysilane:

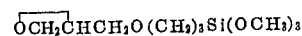

Vinyltrichlorosilane:

$$CH_2=CHSiCl_3$$

Methylvinyldichlorosilane:

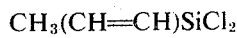

Vinyltriacetoxysilane:

γ-Chloropropyltrimethoxysilane:

The copolymer used in this invention is defined by the specific limitations described above with respect to percent of pendent vinyl group repeating units, average molecular weight ($M_v$), percent by weight above 10,000 molecular weight, percent by weight above 2,000 molecular weight and dilute solution viscosity. In addition to its various uses as described herein for fast curing compositions in which a high percentage of filler is used to avoid crazing and cracking, the polymer of this invention can be cured neat in thin films no thicker than one thirty-second inch and preferably no thicker than one sixth-fourth inch, where the heat is distributed quickly and uniformly in the curing operation, and also in molding compositions cured at a lower temperature and slower curing rate to avoid crazing and cracking. Molded products prepared from this material, even without filler, have improved flexural strength, hardness and chemical resistance and can be used for various purposes where compositions of superior flexural strength, hardness and resistance to chemicals and heat are advantageous.

For such purposes the butadiene-stryene copolymer likewise has at least 60 percent and preferably more than 80 percent of the butadiene repeating units of the structure having a pendent vinyl group, has a gel permeation chromatography number average molecular weight between 10,000 and 50,000, has at least 50 percent and preferably at least 90 percent by weight of the polymer of a molecular weight greater than 10,000, has at least 95 percent by weight of the polymer with a molecular weight greater than 2,000.

In the various curing operations, either with or without filler, advantageous properties are obtained when at least 50 percent, and preferably at least 70 percent of the total unsaturation of the polymer is consumed or used up in the curing process. The amount of remaining unsaturation can be determined easily by infrared analysis.

In order to obtain the intimate mixing of the polymers with the large amounts of filler required, it is most practical to effect the mixing by liquid or solution compounding. For such purposes it is generally desirable to produce the starting copolymer in solvent media. The preferred solvent is a mixture of tetrahydrofurane and hexane, the proportions of each varying according to the microstructure desired and the molecular weight desired in the copolymer. With higher molecular weight copolymers or copolymers having a higher DSV in the range cited, more dilution is required in order to obtain a mixable viscosity. Then again, the use of greater amounts of solvent effects the economics involved in the removal and recovery of the solvent.

The compounding of the filler and copolymer can be performed in a Cone Vertical Mixer which imparts good mixing action. A Baker-Perkins Mixer is preferred for large batches, and a Bramley Mixer and other types of double arm mixers can also be used for this purpose. In some cases, with relatively small amounts of filler, stirring by hand or with a laboratory propeller type stirrer may be adequate.

After solution mixing of the components, the solvent is removed to avoid gassing or bubble formation at elevated curing temperatures. For filler compositions this is done conveniently by vacuum drying at room temperature or temperatures up to 50° C. This composition is used to produce the calendered sheets used in the practice of this invention.

In contrast to the present commerical practice of using as the matrix a viscous liquid resin to which is added a mixing agent such as magnesium oxide to bring the resin to a high voscosity, the present invention employs a solid resin in the form of a calendered sheet. Moreover, in the present commerical practice, a monomer such as styrene is used with the resin used for bonding the glass fibers so that copolymerization in the curing or molding process produces a thermoset resin. In the present invention, the solid resin by virtue of its pendent vinyl groups is capable per se of crosslinking to produce the thermoset resin upon curing. Consequently, where it is desirable to omit a vaporizable monomer, this is possible in the present invention. Moreover, the calendered sheets are permanently positioned and therefore protective even where a copolymerizable monomer is to be used. Consequently, the calendered sheets of the present invention are more practical, easier to handle, have better storability and produce products of better properties, while still permitting the flexibility needed for deep draw applications.

As previously indicated, the invention can be employed in various modifications. The sheet molding compound can comprise a single calendered sheet of the high-vinyl butadiene-styrene copolymer, if desired, additional glass fibers or other fibers, such as asbestos fibers, in the composition of the calendered sheet. In another modification, two calendered sheets having fibrous reinforcement, either glass fibers or another type such as asbestos, with or without other fillers, such as talc, can be used with a layer of glass fiber interposed between the two sheets. The glass fiber layer can be used per se or can be mixed with a binder, comprising either a resin of the type previously used commerically or of the high-vinyl butadiene-styrene copolymer type. If a copolymerizable monomer is used, it is advantageously a less easily vaporized one, such as t-butyl styrene. A high-vinyl butadiene-styrene copolymer mixed with the glass fibers in the interior section is preferably of a lower viscosity as compared with the viscosity of the butadiene-styrene copolymer in the calendered sheet. In still another modification, a still greater number of calendered sheets can be used with fiber glass layers inserted between adjacent sheets, the number of layers depending on the type and thickness of the ultimate product desired.

The sheet molding composition can be prepared by mixing in a Baker-Perkins mixer or other suitable type of mixer, a hexane solution of 50-60 percent of butadiene-styrene copolymer, advantageously about 0.55 dilute solution viscosity, the peroxide catalyst, talc powder or other mineral filler, vinyl silane or other material to improve adhesion, and a base of asbestos or glass fibers. The resultant soft, gummy lumps are allowed to dry in air overnight, or in an oven at 105° C. for 15 minutes, and then calendered in thin flat sheets of the size desired. The sheet molding compound is then formed by sandwiching a predetermined amount of glass filler, woven sheet or chopped strands, preferably using a low viscosity butadiene-styrene copolymer of the type described herein to wet the glass. This assembly is then pressed from both sides to bring about uniform distribution of the low viscosity polymer into the fiber glass layer in order to provide more efficient adhesion.

Blue asbestos in the formulation gives products slightly stronger than those obtained from white asbestos. Talc improves the processing and flexibility. An increase in glass content enhances the impact strength considerably. Because of its dark color, blue asbestos should be confined to calendered sheets used as inner layers in SMC build-up, while sheets from white asbestos, light in color and potentially paintable, are recommended as outer layers.

Sheet molding compound can be prepared in various forms depending on the type of glass reinforcement employed. The basic method of construction involves placing the glass strands or cloth between calendered sheets using a resin varnish to wet the glass, preferably one containing a low viscosity, high vinyl, butadiene-styrene copolymer with or without a diluent, such as hexane which is removed by evaporation, or t-butyl styrene which is copolymerized. Then the composite is pressed from both sides to tie the whole assembly together. This arrangement can provide a sheet molding compound in which a single layer of glass is "sandwiched" between two calendered sheets, as well as a multilayer system with several glass layers alternating with calendered sheets. The sandwich-type concept is simpler and much more practical, while the multilayer arrangement may afford greater strength because of the higher glass content. Generally, both kinds of arrangement allows the glass fibers to become freely impregnated with resin and flow more uniformly between the two outer sheets during the squeezing (or pressing) step.

The individual calendered sheets can be of any thickness desired, but for practical purposes are in the range of 2 mils to 1 inch thickness. With a plurality of sheets, or with glass interposed between two or more sheets, the composite generally has a thickness of at least 10 mils up to any thickness desired.

Advantageously the calendered sheet of this invention has 18-70 percent, preferably 22-28 percent of copolymer with the balance being primarily glass fibers, or other fibers, and filler. The fiber glass content is advantageously 5-70 percent, preferably about 25-45 percent, with the optimum amount being about 30 percent. The higher fiber glass contents give stronger products. However glass fiber is relatively expensive being about 40 cents per pound as compared to about 1 cent per pound for fillers. Therefore it is more practical to use only the amount of glass necessary to give the desired strength and to supplement this with filler.

Thermoplastics resins, such as polyethylene, polystyrene, polypropylene and polymethylmethacrylate, may also be used as modifiers in amounts of 4-60 percent. However since substantial amounts of these may detract from desired properties they are not used extensively. When fiber is interposed between adjacent sheets, this is advantageously 0-35 percent, preferably 10-20 percent of the total weight of the composite.

In many cases the single calendered sheet is sufficient for the molding purpose using the commerically preferred one-eighth inch thickness. If greater molding thickness is desired a plurality of sheets can be used.

The calendered sheet molding compound of this invention has a number of advantages over the present commerical sheet molding compound. One of the chief advantages is that there is no need to use a monomer such as styrene or t-butyl styrene for crosslinking or curing purposes. Consequently the material has a much longer shelf-life, which would otherwise be shortened by vapor loss of the monomer or possible premature polymerization or crosslinking. Moreover freedom from monomer also avoids the adverse effect this has on the strength and chemical stability of the product.

The new composition has greater flexibility in the use of lower or larger amounts of fiberglass than is required in the present commerical sheet molding compound.

The new compound is more easily processed and thereby requires no special machinery. In fact, processing can be carried out with conventional rubber equipment. Moreover, the use of thickeners, such as MgO, is not required as is with present commerical sheet molding compounds. Nor is it necessary to use plastic film, such as polyethylene, to keep the sheets separated.

The present composition also avoids the need for incorporating a thermoplastic material, such as polyethylene, which is more or less necessary with present commerical sheet molding compound.

SPECIFIC EMBODIMENTS OF THE INVENTION

Various methods of practicing the invention are illustrated by the following examples. These examples are intended merely to illustrate the invention and not in any sense to limit the manner in which the invention can be practiced. The parts and percentages recited therein and all through the specification, unless specifically provided otherwise, are by weight. In these examples the dicumyl peroxide is added as Dicup 40, a commerical product which contains 40 percent dicumyl peroxide. The remainder is calcium carbonate.

EXAMPLE I

A series of formulations are prepared by mixing the various components indicated below in Table I in a Baker Perkins mixer for 15 minutes at room temperature. In each case 200 parts of resin cement is used containing 50 percent hexane and 50 percent of a butadiene-styrene copolymer having 40 percent by weight of styrene therein, a vinyl content of over 90 percent, a DSV of 0.35, more than 95 percent of the polymer has a molecular weight over 2,000, and more than 90 percent has a molecular weight between 10,000 and 50,000.

TABLE I

FORMULATIONS FOR CALENDERED SHEETS

| Formulation | I | II | III |
|---|---|---|---|
| Composition: | | | |
| Resin (parts) | 100 | 100 | 100 |
| Hexane (parts) | 100 | 100 | 100 |
| "Dicup 40" * | 10 | 10 | 10 |
| Calcium Stearate | 4 | 4 | 4 |
| Vinyl triacetoxy silane | 2.5 | 2.5 | 2.5 |
| Al silicate filler (Minex 4) | 227.5 | — | — |
| Ca carbonate filler (Atomite) | — | 227.5 | — |
| Silica filler (Novacite) | — | — | 227.5 |
| Glass (¼ inch chopped strands) | 86 | 86 | 86 |

* A commerical product manufactured by Hercules Corporation; contains 40 percent by weight dicumyl peroxide, the balance being calcium carbonate.

The hexane is removed by vaporizing in an evaporating dish and the resulting product is calendered on cold calendering rolls. Specimens from the calendered sheets are molded at 350° F. (177° C.) for 4 minutes at 100 psi. The results are given below in Table II.

TABLE II

EVALUATION OF CALENDERED SHEETS

| Formulation | I | II | III |
|---|---|---|---|
| Properties: | | | |
| Density | 1.82 | 1.86 | 1.84 |
| Hardness, E | 70 | 62 | 75 |
| Flex. Str., psi | 13,600 | 17,000 | 12,550 |
| Flex. Mod., $10^3$ psi | 1,574.3 | 1,354.8 | 1,544.3 |
| Izod Impact (Notch) | 4.8 | 5.9 | 3.3 |

EXAMPLE II

The procedure of Example I of U.S. Pat. No. 3,083,175 is repeated identically to produce a sodium-catalyzed polybutadiene. The resulting butadiene homopolymer is found to have an intrinsic viscosity of 2.6 and to have 60 percent 1,2- microstructure. A gel permeation chart made on this polymer shows the following molecular weight distribution as calculated on the basis of 60 percent vinyl repeating unit content from charts for 100 percent 1,4- structure and 100 percent 1,2- structure respectively.

| Mol. Wt. Distribution | From Calibrated Charts for 100% 1,4- Polybutadiene | 100% 1,2- Polybutadiene | Calculated for Ex. II Polymer on basis of 60% 1,2- |
|---|---|---|---|
| Below 2,000 | 13.5 | 11.0 | 12.0 |
| 2,000–10,000 | 6.6 | 7.3 | 7.02 |
| 10,000–50,000 | 28.06 | 26.3 | 27.10 |
| 50,000–100,000 | 12.84 | 12.4 | 12.64 |
| 100,000–150,000 | 6.50 | 6.7 | 6.62 |
| 150,000–500,000 | 16.98 | 17.6 | 17.36 |
| 500,000–1,500,000 | 10.40 | 11.2 | 10.88 |
| Over 1,500,000 | 5.10 | 6.5 | 5.94 |

As indicated in U.S. Pat. No. 3,083,175, this polymer cures with peroxide to a hard rubber product having an elongation of 100 percent or more and tensile strength of no more than about 650 psi.

EXAMPLE III

The procedure of Example I is repeated a number of times modified individually by the addition of a thermoplastic resin and using the amounts indicated in the following table. The numerical values represent parts by weight.

| | 1 | 2 | 3 | 4 |
|---|---|---|---|---|
| Copolymer (61% BD:39% Styr.) (0.34 DSV) | 100 | 100 | 100 | 100 |
| Hexane | 200 | 200 | 200 | 200 |
| "Dicup 40" * | 20 | 20 | 20 | 20 |
| Ca stearate | 3 | 3 | 3 | 3 |
| Silane (DOW 6075) | 2 | 2 | 2 | 2 |
| Asbestos | 12 | 12 | 12 | 12 |
| Silica | 55 | 55 | 55 | 87 |
| Glass strands (¼ inch) | 96 | 96 | 96 | 96 |
| Polystyrene | 32 | | | |
| Polypropylene | | 32 | | |
| Polyacrylate (Acryloid KM-228) | | | 32 | |

* As described in Example I.

In each case the product is placed in an aluminum tray and airdried under the hood. The resultant thick gummy chunks had approximately the following composition:

| | | | | |
|---|---|---|---|---|
| Copolymer | 32% | 32% | 32% | 32% |
| Glass | 30% | 30% | 30% | 30% |
| Filler | 28% | 28% | 28% | 38% |
| Thermoplastic modifiers | 10% | 10% | 10% | |

The dried product is calendered to form flat continuous sheets approximately one-fourth inch thick. Upon compression molding at 335° F. for 4 minutes at 1,000 psi, these sheets give the following properties

| | 1 | 2 | 3 | 4 |
|---|---|---|---|---|
| Hardness, Rockwell E | 47 | 34 | 58 | 72 |
| Flex. Strength, psi | 13,000 | 12,500 | 17,000 | 18,000 |
| Flex.Mod., psi $\times 10^6$ | 1.405 | 1.25 | 1.51 | 1.584 |
| Izod Impact (notch) | 2.6 | 2.1 | 4.0 | 3.9 |
| Water absorption % (24 hrs., 100° C.) | 0.65 | 0.44 | 0.55 | 0.45 |
| Microcracks | None | None | None | None |

EXAMPLE IV

The procedure of Example I is repeated a number of times using variations in the amount of copolymer as indicated in the table below:

| | 1 | 2 | 3 | 4 | 5 | 6 |
|---|---|---|---|---|---|---|
| Copolymer (DSV 0.34)(55-BD: 45-styr.) | 100 | 100 | 100 | 100 | 100 | 100 |
| Hexane | 200 | 200 | 200 | 200 | 200 | 200 |
| "Dicup 40"* | 20 | 20 | 20 | 20 | 20 | 20 |
| Silica | 75 | 115 | 193 | 175 | 223 | 275 |
| Silane (Dow 6075) | 2 | 2 | 2 | 2 | 3 | 3 |
| Glass strands (¼") | 50 | 60 | 67 | 75 | 87 | 100 |
| Ca. stearate | 3 | 3 | 3 | 3 | 3 | 3 |
| Approx. composition after drying, percent: | | | | | | |
| Copolymer | 40 | 33.3 | 30 | 26.5 | 23 | 20 |
| Glass | 20 | 20 | 20 | 20 | 20 | 20 |
| Filler | 40 | 46.7 | 50 | 53.5 | 57 | 60 |

*As described in Example I.

NOTE.—Compression molding of the ¼" calendered sheets for 4 minutes at 335° F. and 1,000 p.s.i. gives the following properties:

| | 1 | 2 | 3 | 4 | 5 | 6 |
|---|---|---|---|---|---|---|
| Hardness, "E" | 46 | 52 | 54 | 62 | 67 | 71 |
| Flex. str., p.s.i. | 12,320 | 12,500 | 12,740 | 13,400 | 14,930 | 14,000 |
| Flex. mod., p.s.i. ×10⁶ | 0.82 | 0.927 | 1.091 | 1.208 | 1.314 | 1.425 |
| Izod impact (notch) | 3.0 | 3.3 | 2.4 | 2.3 | 2.5 | 2.0 |
| Shrinkage, percent | 0.28 | 0.24 | 0.22 | 0.20 | 0.18 | 0.21 |
| Water absorption, percent (24 hrs., 100° C.) | 0.34 | 0.31 | 0.28 | 0.27 | 0.24 | 0.23 |
| Microcracks | None | None | None | None | None | None |

EXAMPLE V

The procedure of Example I is repeated a number of times varying the fiberglass content and using the components and proportions shown in the table below:

| | 1 | 2 | 3 | 4 | 5 |
|---|---|---|---|---|---|
| Copolymer (DSV 0.34) (60 BD:40 styr.) | 100 | 100 | 100 | 100 | 100 |
| Hexane | 200 | 200 | 200 | 200 | 200 |
| "Dicup 40" * | 20 | 20 | 20 | 20 | 20 |
| Ca. stearate | 4 | 4 | 4 | 4 | 4 |
| Silane (Z 6075) | 1 | 1 | 1 | 1 | 1 |
| Silica | 275 | 235 | 195 | 155 | 115 |
| Glass strands (¼") | | 40 | 80 | 120 | 160 |
| Approximate composition after drying, percent: | | | | | |
| Copolymer | 25 | 25 | 25 | 25 | 25 |
| Glass | | 10 | 20 | 30 | 40 |
| Filler | 75 | 65 | 55 | 45 | 35 |

*As described in Example I.

NOTE.—Compression molding of the ¼" calendered sheets for 4 minutes at 335° F. and 1,000 p.s.i. gives the following properties:

| | 1 | 2 | 3 | 4 | 5 |
|---|---|---|---|---|---|
| Hardness, "E" | 51 | 61 | 66 | 68 | 70 |
| Flex. str., p.s.i. | 10,650 | 11,650 | 12,430 | 13,790 | 15,352 |
| Flex. mod., p.s.i.×10⁶ | 1.051 | 1.219 | 1.314 | 1.584 | 1.668 |
| Izod impact (notch) | 0.28 | 1.28 | 2.40 | 3.45 | 4.17 |
| Water absorption, percent (24 hrs., 100° C.) | 0.88 | 0.43 | 0.35 | 0.35 | 0.34 |
| Microcracks | None | None | None | None | None |

EXAMPLE VI

The procedure of Example I is repeated a number of times using copolymers of varying intrinsic viscosities. The components and proportions are shown in the following table:

| | 1 | 2 | 3 | 4 | 5 |
|---|---|---|---|---|---|
| Copolymer (60 BD:40 styr.) dil. sol. visc. | 0.23 | 0.32 | 0.34 | 0.39 | 0.5 |
| Parts | 100 | 100 | 100 | 100 | 100 |
| Hexane | 200 | 200 | 200 | 200 | 200 |
| "Dicup 40"* | 20 | 20 | 20 | 20 | 20 |
| Ca. stearate | 4 | 4 | 4 | 4 | 4 |
| Silane (#6075) | 1 | 1 | 1 | 1 | 1 |
| Titanox | 12 | 12 | 12 | 12 | 12 |
| Glass strands (¼") | 91 | 91 | 91 | 91 | 91 |
| Silica | 225 | 225 | 225 | 225 | 225 |

*As described in Example I.

NOTE.—When the dried, calendered sheets (¼") are compression molded for 4 minutes at 335° F. and 1,000 p.s.i., they have the following properties:

| | 1 | 2 | 3 | 4 | 5 |
|---|---|---|---|---|---|
| Hardness, "E" | 65 | 66.5 | 68 | 70.5 | 75 |
| Flex. str., p.s.i. | 9,235 | 11,472 | 12,551 | 12,430 | 12,018 |
| Flex. mod., p.s.i.×10⁶ | 1.445 | 1.555 | 1.540 | 1.525 | 1.554 |
| Izod impact (notch) | 1.45 | 1.68 | 1.96 | 1.82 | 1.37 |
| Shrinkage, percent | 0.20 | 0.17 | 0.11 | 0.18 | 0.20 |
| Microcracks | None | None | None | None | None |
| Water absorption, percent (24 hrs., 100° C.) | 0.51 | 0.33 | 0.38 | 0.39 | 0.38 |

EXAMPLE VII

The procedure of Example I is repeated twice using t-butyl styrene as monomer extender with the following formulations:

| | 1 | 2 |
|---|---|---|
| Copolymer (DSV 0.5) (60:40, BD/Styr.) | 100 | 100 |
| Hexane | 125 | 125 |
| Chloroform | | 40 |
| "Dicup 40" * | 12.5 | 12.5 |
| Ca stearate | 2.0 | 2.0 |
| Silane (No. 6075) | 1.5 | 1.5 |
| t-Butyl styrene | 10.0 | 15.0 |
| Polyacrylate (Acryloid KM-29) | 15.0 | 10.0 |
| Mineral filler (Atomite) | 160 | 173 |
| Glass strands (¼ inch) | 128 | 134 |

* As described in Example 1

After removal of the hexane and chloroform calendered sheets (one-fourth inch) are formed and molded to give the following properties:

| | | |
|---|---|---|
| Hardness, E | 60 | 65 |
| Flex.Str., psi | 19,160 | 19,500 |
| Flex.Mod., psi | 1,170,000 | 1,253,000 |
| Izod impact (notch) | 5.2 | 5.5 |
| Shrinkage | 0.09 | 0.07 |
| Surface appearance | Smooth | Good |

EXAMPLE VIII

The procedure of Example I is repeated four times using copolymers having different butadiene-styrene ratios. The formulations and results are shown in the following table:

| | 1 | 2 | 3 | 4 |
|---|---|---|---|---|
| Copolymer | 100 | 100 | 100 | 100 |
| Butadiene/Styrene Ratio | 77/23 | 60/40 | 55/45 | 50/50 |
| Hexane | 250 | 250 | 250 | 250 |
| "Dicup 40" * | 15 | 15 | 15 | 15 |
| Ca stearate | 2 | 2 | 2 | 2 |
| Asbestos | 30 | 30 | 30 | 30 |
| Aluminum powder | 12 | 12 | 12 | 12 |
| Silane | 1 | 1 | 1 | 1 |
| Glass strands (¼") | 135 | 135 | 135 | 135 |

* As described in Example I.

The dried calendered sheets when molded for 12 minutes at 320° F. and 1,000 psi show the following properties:

| | 1 | 2 | 3 | 4 |
|---|---|---|---|---|
| Hardness, E | 83 | 85 | 84 | 84 |
| Flex.Str., psi | 24000 | 26000 | 21500 | 20400 |
| Flex.Mod., psi × 10⁶ | 1.670 | 1.738 | 1.524 | 1.450 |
| Izod impact, (notch) | 8.7 | 10.0 | 7.4 | 7.0 |

EXAMPLE IX

A butadiene-styrene copolymer containing 40 percent styrene and 60 percent butadiene is prepared using a polymerization system of lithium biphenyl in tetrahydrofuran and the copolymer has 93 percent 1,2-structure in the butadiene portion, a DSV of 0.314 and an average molecular weight of 30,500. This copolymer is dissolved in benzene containing 2 parts of dicumyl peroxide per 100 parts of copolymer. The benzene is removed under reduced pressure and the dried copolymer is molded (without filler) at 145° C. for 4 hours to give a hard, rigid thermoset product with the following properties:

| | |
|---|---|
| Rockwell hardness E | 81 |
| Flexural strength, psi | 7,900 |
| Flexural modulus, psi | 312,000 |
| Elongation, % | 0.8 |
| Izod impact (notch) ft.lb./in. | 0.31 |
| Heat distortion temp. at 264 psi, °C. | 129 |

This product differs sharply in properties particularly in elongation and hardness, compared to the hard rubber produced in Example II above in which the procedure of Example I of U.S. Pat. No. 3,083,175 was followed.

EXAMPLE X

A layer of 50 grams of one-half inch glass fibers is sandwiched between two calendered sheets having the formulation of Example VIII-2, each sheet having a thickness of 0.06 inches and weighing 200 grams. The glass fibers are wetted with 95 grams of a varnish comprising 65 grams of a 60/40 butadiene-styrene copolymer having a DSV of 0.25, 35 grams of t-butyl styrene and 3 grams of dicumyl peroxide. The sandwich is pressed to give a flexible composite of 0.138 inch thickness. This is deep draw cured at 335° F. and 1000 psi for 4 minutes to give a Rockwell "E" hardness of 86, and Izod impact of 9.0 ft.lb./in., flexural strength of 22,000 psi and flexural modulus of 1,715,000 psi.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:

1. An improved sheet molding compound comprising at least one calendered sheet of a composition comprising in intimate mixture
  a. 18–70 percent by weight of a butadiene-alkenyl aryl copolymer having 50–75 percent by weight butadiene, 25–50 percent by weight of an alkenyl aryl comonomer, a number average molecular weight of 10,000 to 50,000, at least 50 percent by weight of the copolymer having a molecular weight of at least 10,000, at least 95 percent by weight of the copolymer having a molecular weight of at least 2,000, and at least 60 percent of the butadiene repeating units therein being of the pendent alkenyl structure, said alkenyl aryl comonomer having no more than 20 carbon atoms and being selected from the class consisting of vinyl aryl and isopropenyl aryl compounds and derivatives thereof in which there are no more than two derivative groups, each of said derivative groups is attached to the aromatic nucleus of said compound and is selected from the class consisting of alkyl, aryl, cycloalkyl and chlorine groups;
  b. a peroxy compound having a structure represented by the formula $H_3C(R)_2O-OC(R)_2CH_3$ wherein R represents an aryl or alkyl radical of 1-20 carbon atoms, the amount of said peroxy compound being equivalent to 0.5–8 percent by weight of dicumyl peroxide; and
  c. a filler material, substantially inert to said polymer and said peroxy compound in a proportion such that the filler is 25-70 weight percent of said mixture;

there being at least 5 percent by weight of glass fibers in said calendered sheet or sheets based on total weight of said sheet molding compound, said 5 percent or more of said glass fibers being calculated as at least part of said 25–70 percent filler, and there being 0–35 percent by weight of glass fibers interposed between adjacent calendered sheets.

2. The sheet molding compound of claim 1 in which said alkenyl aryl comonomer is styrene.

3. The sheet molding compound of claim 2 in which said filler is selected from the class consisting of glass fiber, asbestos fiber, cellulosic fiber, alumina, mica, feldspar, talc, silica, clay, powdered metal, carbon black and graphite.

4. The sheet molding compound of claim 2 in which there are at least two of said calendered sheets and at least 10 percent by weight of said glass fibers based on total weight of sheet molding compound is interposed between adjacent calendered sheets.

5. The sheet molding compound of claim 4 in which said interposed glass fibers are impregnated with a thermosettable resin.

6. The sheet molding compound of claim 5 in which said thermosetting resin is a butadiene-styrene copolymer containing 55–65 percent by weight of butadiene and said butadiene has at least 80 percent of its repeating units in the pendent-vinyl structure.

7. The sheet molding compound of claim 4 in which at least 80 percent of the butadiene repeating units in said butadiene-styrene copolymer have a pendent-vinyl structure.

8. The sheet molding compound of claim 7 in which said butadiene-styrene copolymer has 35–45 percent styrene and 55–65 percent butadiene.

9. The sheet molding compound of claim 1 in which said butadiene-styrene copolymer has 35–45 percent styrene and 55–65 percent butadiene therein.

10. The sheet molding compound of claim 9 in which at least 80 percent of the butadiene repeating units in said butadiene-styrene copolymer have the pendent vinyl structure.

11. The sheet molding compound of claim 10 which has 25–35 percent by weight of glass fibers therein.

12. The sheet molding compound of claim 1 which has 25–35 percent by weight of glass fibers therein.

13. The sheet molding compound of claim 12 which has 22–28 percent by weight of said copolymer therein.

* * * * *

PO-1050
(5/69)

UNITED STATES PATENT OFFICE
CERTIFICATE OF CORRECTION

Patent No. 3,773,709          Dated November 20, 1973

Inventor(s) Stephen P. Boutsicaris

It is certified that error appears in the above-identified patent and that said Letters Patent are hereby corrected as shown below:

PAGE 2 - CORRECTIONS

In Column 11, in Table II, "Hardness E" should be --Hardness "E"--.

In Column 12, Line 2, the first "the" should be --a--.

In Column 12, in Example IV, first item in table, after "copolymer" "45-45-styr." should be --45-Styr.--.

In Column 12, Line 48;

In Column 13, Line 11; and

In Column 13, Line 37; in each instance "Note" should be cancelled.

Signed and sealed this 4th day of February 1975.

(SEAL)
Attest:

McCOY M. GIBSON JR.            C. MARSHALL DANN
Attesting Officer              Commissioner of Patents